US011599988B2

(12) United States Patent
Wo et al.

(10) Patent No.: US 11,599,988 B2
(45) Date of Patent: Mar. 7, 2023

(54) INSPECTION OF CIRCUIT BOARDS FOR UNAUTHORIZED MODIFICATIONS

(71) Applicant: SUPER MICRO COMPUTER, INC., San Jose, CA (US)

(72) Inventors: Bo-Han Wo, Taipei (TW); Chun-Yi Lin, Taoyuan (TW); Yu-Lung Shih, Taoyuan (TW); Kai Cheng Wen, Taoyuan (TW); Kevin Wei-Chou Chen, Dublin, CA (US); Yu-Jung Liang, Taoyuan (TW); Pei Hsiang Yang, San Jose, CA (US); Jenn-Chih Chou, San Jose, CA (US)

(73) Assignee: Super Micro Computer, Inc., San Jose, CA (US)

( * ) Notice: Subject to any disclaimer, the term of this patent is extended or adjusted under 35 U.S.C. 154(b) by 420 days.

(21) Appl. No.: 17/019,054

(22) Filed: Sep. 11, 2020

(65) Prior Publication Data

US 2022/0084174 A1 Mar. 17, 2022

(51) Int. Cl.
*G06T 7/00* (2017.01)

(52) U.S. Cl.
CPC .............. *G06T 7/001* (2013.01); *G06T 7/97* (2017.01); *G06T 2207/30141* (2013.01)

(58) Field of Classification Search
CPC . G06T 7/001; G06T 7/97; G06T 2207/30141; G06T 7/0008; G06T 3/0012; G06T 5/30; G06T 5/50; G06T 7/13; G06T 7/62; G06T 2207/10116; G06T 2207/20224; G06T 2207/30148
See application file for complete search history.

(56) References Cited

U.S. PATENT DOCUMENTS

| | | | | |
|---|---|---|---|---|
| 5,862,973 | A * | 1/1999 | Wasserman | G01N 21/88 228/103 |
| 7,177,458 | B1 * | 2/2007 | Savareigo | G06V 10/22 348/126 |
| 2006/0153439 | A1 * | 7/2006 | Moriya | G01R 31/71 382/147 |
| 2007/0036420 | A1 * | 2/2007 | Enachescu | G06T 7/001 382/141 |
| 2009/0208089 | A1 * | 8/2009 | Probst | G06T 7/001 382/145 |
| 2012/0027284 | A1 * | 2/2012 | Hung | G03F 1/84 382/144 |
| 2012/0045115 | A1 * | 2/2012 | Dong | G01N 21/95607 382/149 |
| 2015/0221076 | A1 * | 8/2015 | Gao | G06T 7/001 382/149 |
| 2020/0160496 | A1 * | 5/2020 | Inoue | G06T 7/11 |
| 2021/0097672 | A1 * | 4/2021 | Shankar | G06V 10/50 |

* cited by examiner

*Primary Examiner* — Christopher M Brandt

(74) *Attorney, Agent, or Firm* — Beyer Law Group LLP

(57) ABSTRACT

A target image of a target circuit board and a gold image of a gold circuit board are taken by an image acquisition system. Fiducial points are located on the target image and on the gold image. Perspective transformation is performed on the target image using the fiducial points on the target image for reference and on the gold image using the fiducial points on the gold image for reference. After perspective transformation, an anomalous section of the target image is identified by identifying pixels that have different intensities between the target image and the gold image, the anomalous section being indicative of an unauthorized modification to the target circuit board.

20 Claims, 11 Drawing Sheets

INSPECTION OF CIRCUIT BOARDS FOR UNAUTHORIZED MODIFICATIONS

BACKGROUND OF THE INVENTION

1. Field of the Invention

The present invention relates generally to circuit board manufacturing, and more particularly but not exclusively to inspection of circuit boards.

2. Description of the Background Art

Electrical circuits may be implemented on a circuit board. Depending on the electrical circuit, a circuit board may have many components, including integrated circuit chips, discrete components (e.g., capacitors, resistors, inductors), switches, jumpers, traces, etc. Examples of circuit boards include motherboards (also referred to as main circuit boards) and daughter boards that are used in computer systems and other electronic devices. It is critical not just for functionality but also for security reasons that a circuit board is manufactured to design specifications. For example, an unauthorized modification (e.g., adding a hacking chip) to a circuit board of a network device may allow a cyber criminal to infiltrate a computer network.

SUMMARY

In one embodiment, a target image of a target circuit board and a gold image of a gold circuit board are taken by an image acquisition system. Fiducial points are located on the target image and on the gold image. Perspective transformation is performed on the target image using the fiducial points on the target image for reference and on the gold image using the fiducial points on the gold image for reference. After perspective transformation, an anomalous section of the target image is identified by identifying pixels that have different intensities between the target image and the gold image, the anomalous section being indicative of an unauthorized modification to the target circuit board.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
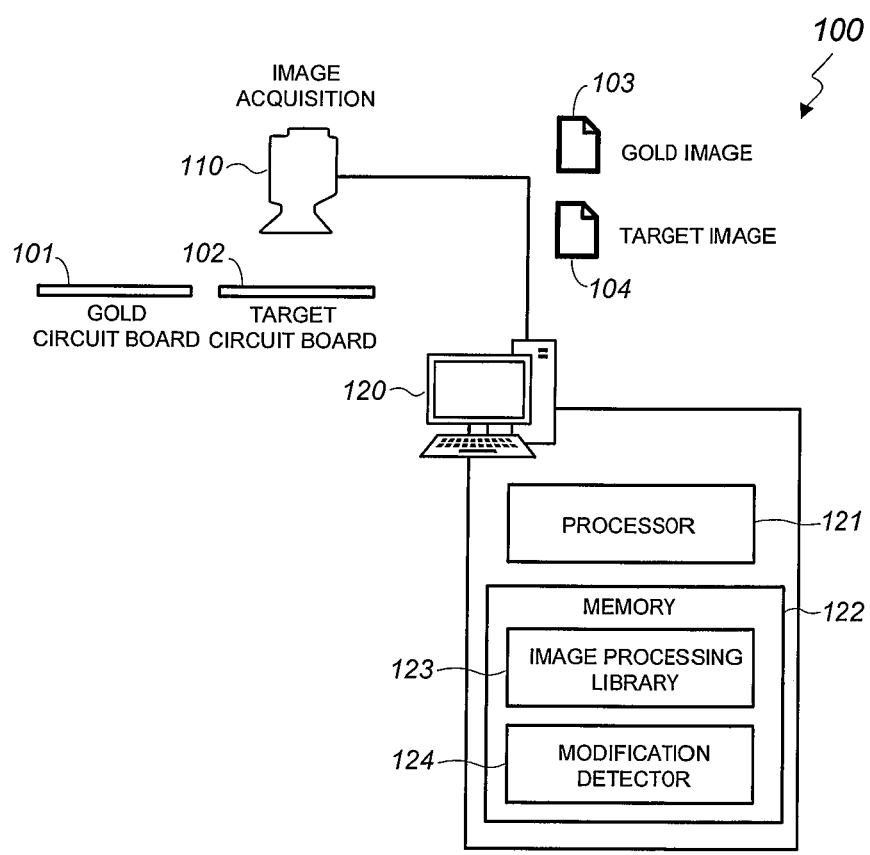
FIG. 1 shows a logical diagram of an inspection system in accordance with an embodiment of the present invention.

FIG. 1 shows a logical diagram of an inspection system 100 in accordance with an embodiment of the present invention. The inspection system 100 is configured to detect unauthorized modifications to a target (i.e., being inspected) circuit board 102. The inspection system 100 may comprise an image acquisition system 110 and a computer 120. In the example of FIG. 1, the inspection system 100 is configured to detect one or more differences between the target circuit board 102 and a gold circuit board 101 based on their respective images. The gold circuit board 101 is "gold" in that it is a known-good circuit board, i.e., verified to have been manufactured as per design specifications. The target circuit board 102 is expected to be manufactured to the same design specifications as the gold circuit board 101. A feature (e.g., component, trace) that is present in the target circuit board 102 but is not present in the gold circuit board 101 is deemed to be an unauthorized modification of the target circuit board 102.

In the example of FIG. 1, an image acquisition system 110 is configured to take an image of a subject, such as a circuit board. In one embodiment, the image acquisition system 110 comprises an X-ray imaging machine, and each of the gold image 103 and the target image 104 is an X-ray image. An X-ray imagining machine advantageously captures relatively small features (e.g., traces) of circuit boards. Depending on the application, other suitable imaging machines may also be used, including Automated Optical Inspection (AOI) machines.

In the example of FIG. 1, the image acquisition system 110 takes an image of the gold circuit board 101 to generate a gold image 103 and takes an image of the target circuit board 102 to generate a target image 104. In one embodiment, the gold image 103 and the target image 104 are x-ray images in grayscale. The gold image 103 and target image 104 may be represented in TIFF or another image file format.

The computer 120 may comprise a workstation, server computer, a desktop computer, or other computing device. The computer 120 includes a processor 121 (e.g., central processing unit), a memory 122 (e.g., random access memory, solid state drive), and other computer components that are not shown (e.g., keyboard, network interface card, display screen, I/O ports). In the example of FIG. 1, the memory 122 stores instructions of an image processing library 123 and of a modification detector 124. The instructions stored in the memory 122, when executed by the processor 121, cause the computer 120 to perform its functions as described below.

The image processing library 123 comprises functions or other program code for image processing. In one embodiment, the image processing library 123 comprises the OpenCV library. Other suitable image processing libraries or program code for image processing may also be employed. As can be appreciated, the use of the image processing library 123 is largely a matter of convenience. One can always write his or her own program code to perform an image processing step.

The modification detector 124 is configured to detect unauthorized modifications to a target circuit board. In the example of FIG. 1, the gold image 103 and the target image 104 are received in the computer 120. The gold image 103 and the target image 104 may be received as image files, whose contents are subsequently loaded in the memory 122 for processing by the modification detector 124. The modification detector 124 may perform image processing algorithms described below, in conjunction with the image processing library 123, to detect unauthorized modifications on the target image 104 relative to the gold image 103.

Figure 2:
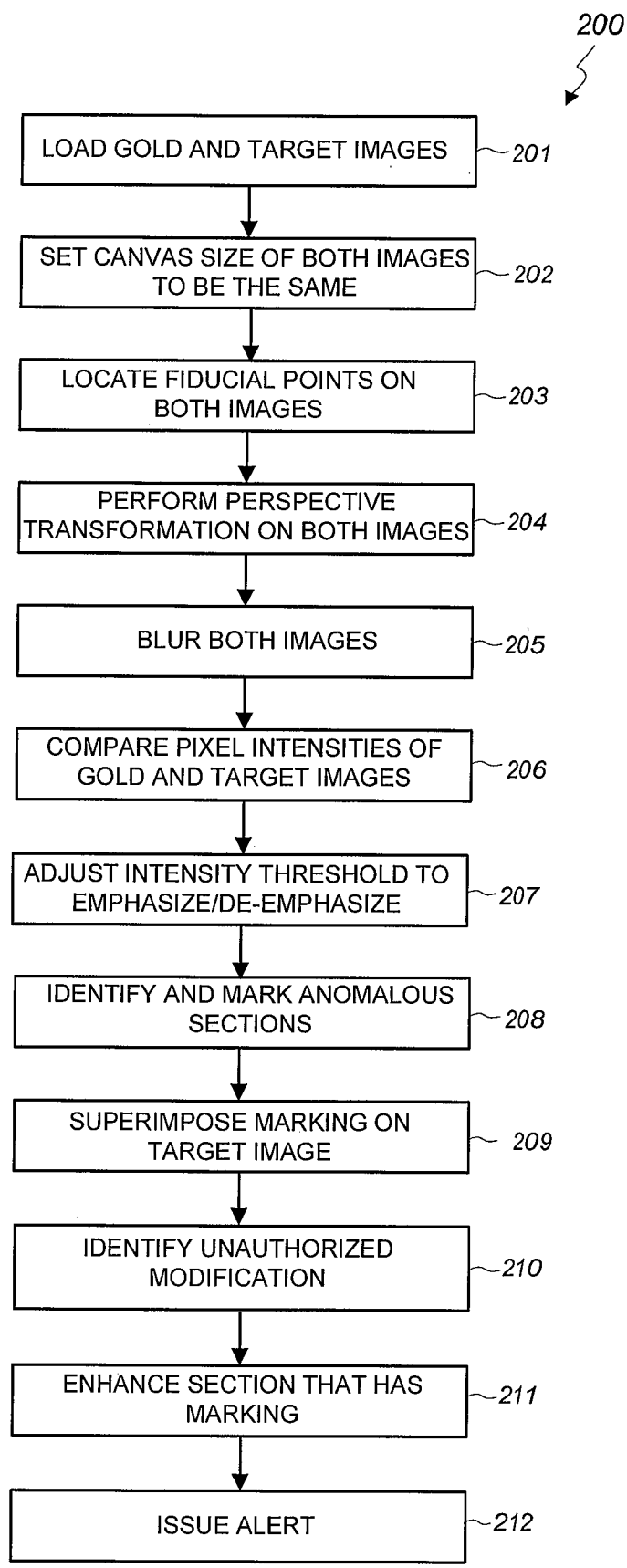
FIG. 2 shows a flow diagram of a method of inspecting circuit boards for unauthorized modifications in accordance with an embodiment of the present invention.

FIG. 2 shows a flow diagram of a method 200 of inspecting circuit boards for unauthorized modifications in accordance with an embodiment of the present invention. The method 200 may be performed by the modification detector 124 in the computer 120. In the example of FIG. 2, the steps of the method 200 are performed on the gold image 103 and the target image 104 in sequential order. For example, images being processed in step 206 have already been set to the same canvas size (as in step 202), perspective transformed (as in step 204) using located fiducial points for reference (as in step 203), and blurred (as in step 205).

In step 201, the gold image 103 and the target image 104 are loaded in the memory 122 for processing. For example, the gold image 103 and the target image 104 may be loaded from their respective files using the "imread" function of the OpenCV library.

In step 202, the gold image 103 and the target image 104 are set to have the same canvas size. In one embodiment, canvas size refers to the width and height of an image in units of pixels. More particularly, the gold image 103 and/or the target image 104 may be scaled up or down, such that both images have the same width and height. Setting the two images to have the same canvas size includes adjusting one or both dimensions (i.e., width and/or height) of one or both images. An image may have surrounding white portions at the edges, which show portions that are not part of the circuit board. The white portions may be enlarged so that the gold image 103 and the target image have the same canvas size.

In step 203, fiducial points are located on each of the gold image 103 and the target image 104. A fiducial point is a point of reference on an image. In one embodiment, four fiducial points, one on each corner, are located on each image. The fiducial points may be mounting holes (e.g., screw holes) on each corner of a circuit board, for example.

In step 204, perspective transformation is performed on each of the gold image 103 and the target image 104. The gold circuit board 101 and the target circuit board 102 are three-dimensional objects that are represented in two dimensions on their respective images. Perspective transformation corrects or minimizes errors caused by projecting a three-dimensional circuit board to a two-dimensional image. The fiducial points found in step 204 may be used to calibrate and align the gold image 103 and target image 104 to have the same size and aspect ratio by perspective transformation. That is, perspective transformation of an image may be performed using the located fiducial points on the image for reference. For example, the four fiducial points located in the step 203 may be employed in conjunction with the "getPerspectiveTransform" function of the OpenCV library to perform perspective transformation on the gold image 103 and the target image 104.

In step 205, the gold image 103 and the target image 104 are blurred to reduce the noise level of the images. The blurring step smooths the boundary edges of dual in-line packaged (DIP) components, such as Dual in-Line Memory Module (DIMM) sockets, heatsinks, etc. The blurring step advantageously reduces unnecessary displacement tolerances of these components as they appear on the image.

In step 206, the intensities of corresponding pixels of the gold and target images are compared. In one embodiment, the target image 104 is subtracted from the gold image 103 to generate a difference image. In a grayscale image, each pixel has a matrix location and an intensity. In the case of an 8-bit intensity, the intensity may be in the range of 0 to 255. In one embodiment, an intensity of zero is designated as minimum intensity and an intensity of 255 is designated as maximum intensity, with an intensity of 1 to 254 being a shade between minimum and maximum intensities. In one embodiment, a pixel with minimum intensity appears as black on the image, whereas a pixel with maximum intensity appears as white on the image.

For each pixel, the subtraction step subtracts the intensity of a pixel of the target image 104 from the intensity of a corresponding pixel (i.e., same matrix location) of the gold image 103. A pixel of the difference image has a zero intensity when corresponding pixels of the gold image 103 and the target image 104 have the same intensity. In one embodiment, a pixel of the difference image with a zero intensity indicates no modification and will appear as fully black, i.e., minimum intensity, on the difference image. In one embodiment, a pixel of the difference image with a negative intensity is ignored for purposes of detecting unauthorized modifications, because negative intensity is indicative of assembly errors (e.g., missing components) rather than unauthorized modifications, which typically involve adding components (e.g., hacking chips) to the target circuit board 102.

In one embodiment, a pixel of the difference image will have a non-zero intensity when corresponding pixels of the gold image 103 and the target image 104 have different intensities. In that case, the non-zero intensity is compared to an intensity threshold, and the non-zero intensity is converted to maximum intensity when the non-zero intensity exceeds the intensity threshold. The intensity threshold may be adjusted to emphasize or de-emphasize sections of pixels that have different intensities on the target image 104 and the gold image 103 (step 207). That is, after the thresholding, pixels of the difference image with intensities that meet (i.e., equal to or greater than) the intensity threshold will appear more prominent, making them easier to distinguish from pixels with intensities below the intensity threshold.

Sections of pixels with intensities that meet the intensity threshold indicate differences between the target image 104 and the gold image 103 and are thus indicative of unauthorized modifications. These sections of pixels, which are also referred to herein as anomalous sections, may be identified with markings (step 208). The markings may be superimposed on the target image 104 (step 209) to locate the anomalous sections on the target image 104 (step 210). A portion of the target image 104, e.g., quadrant, where a marking identifies an unauthorized modification may be enhanced to facilitate identification of the unauthorized modification (step 211). The enhancement may involve enlarging the section with the unauthorized modification.

In response to detecting an unauthorized modification, an alert may be raised (step 212) to notify inspection personnel of the detection of the unauthorized modification on the target circuit board 102. The alert may be visual (e.g., flashing light, colored button or icon on an interface), acoustical (e.g., alarm sound), textual (e.g., text message, email, log entry, message window, characters on an interface), or in some other form.

Figure 3:
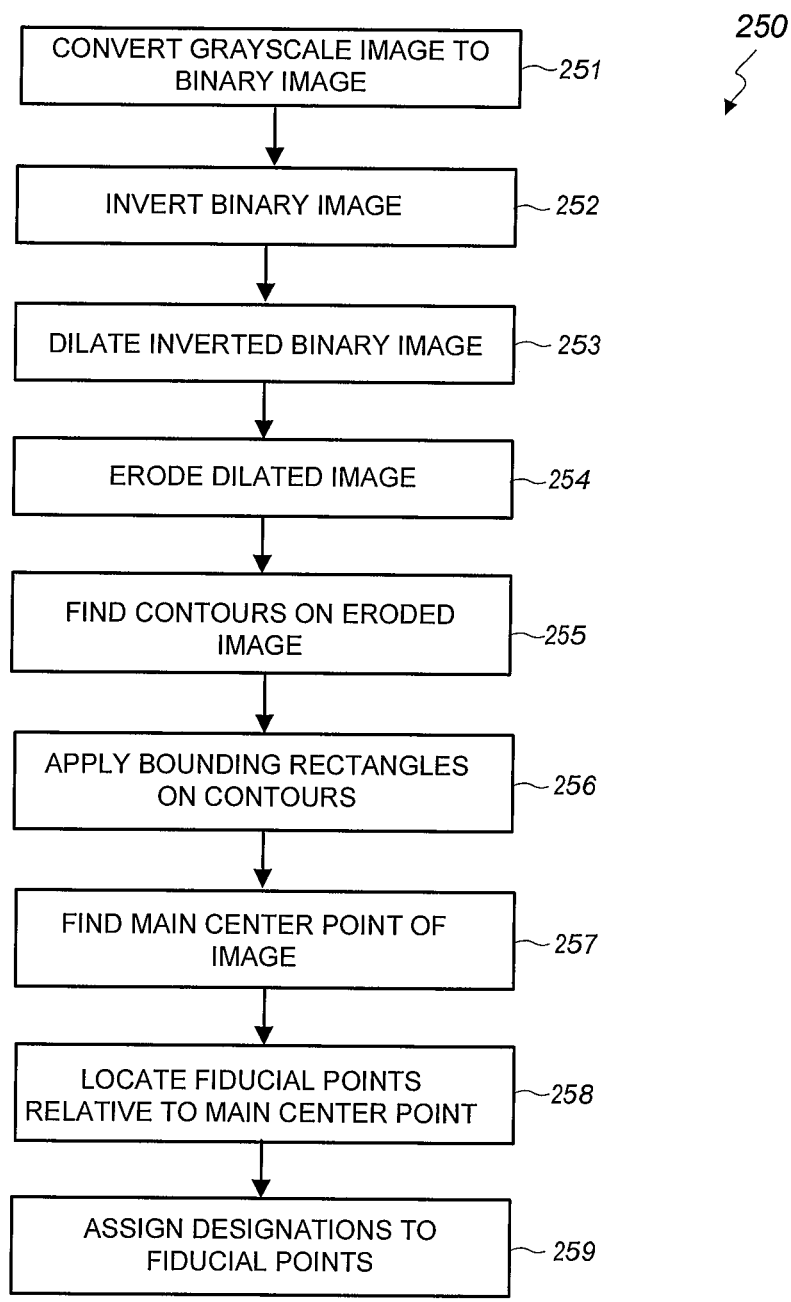
FIG. 3 shows a flow diagram of a method of locating fiducial points on an image in accordance with an embodiment of the present invention.

FIG. 3 shows a flow diagram of a method 250 of locating fiducial points on an image in accordance with an embodiment of the present invention. The method 250 may be performed as the step 203 of the method 200 (see FIG. 2) to locate fiducial points on each of the gold image 103 and the target image 104. The method 250 is performed after both images have been set to have the same canvas size (i.e., after step 202 of the method 200). In the example of FIG. 3, the steps of the method 250 are performed in sequential order.

In step 251, an image is converted from a grayscale image to a binary image. A grayscale image has a spectrum distribution of pixel intensities, which range from minimum intensity (e.g., "0") to maximum intensity (e.g., "255"). In the spectrum distribution, each intensity has an associated number of pixels that have that intensity. An accumulation of intensities, from maximum intensity down to a cutoff intensity, contributes a number of pixels that is greater than a percentage of the total pixel count of the entire image. The cutoff intensity may be used as a limit for converting the grayscale image to the binary image. For example, an intensity that is below the cutoff intensity may be converted to minimum intensity, and an intensity that is equal to or greater than the cutoff intensity may be converted to maximum intensity. Each pixel on the binary image will result in having one of two possible intensities, i.e., either minimum intensity or maximum intensity. The binary image is thereafter inverted to generate an inverted binary image (step 252). The inverted binary image may be generated by inverting the intensities of each pixel of the binary image, i.e., from maximum intensity to minimum intensity and vice-versa.

In step 253, the image is dilated to expand the white portions of the image by a predetermined factor. The dilation step causes the white portions of the image to get larger, thereby removing some noise from the image. That is, the expansion of the white portions of the image removes smaller black portions on the image. The dilation step may be performed using the "dilate" function of the OpenCV library, for example.

In step 254, the white portions of the image are eroded to enhance the contrast between white and black portions of the image. In one embodiment, mounting holes on a circuit board are used as fiducial points. The erosion step makes the mounting holes appear more prominent with enhanced contrast on the image. The erosion step may be performed using the "erode" function of the OpenCV library, for example.

In step 255, the contours of the image are found. A contour is a curve that joins continuous points along a boundary that have the same intensity. The contours of the image show the features on the image. For example, the "findContours" function of the OpenCV library may be used to find all contours on the image.

In step 256, each contour of the image is bound by a rectangle. A contour has a center point, which is also referred to herein as "contour center point". For each contour, a bounding rectangle may be found by finding the contour center point and generating a rectangle with a perimeter that covers the contour. A minimum area of a bounding rectangle may be specified such that contours with bounding rectangles that do not meet (i.e., less than) the minimum area may be removed from inspection consideration. The contours of the image may be bounded by rectangles using the "boundingRect" function of the OpenCV library, for example.

In step 257, a main center point of the entire image is found. In one embodiment, the main center point of the entire image is the contour center point of the largest contour on the image.

In step 258, fiducial points are located relative to the main center point. In one embodiment, an image is divided into four quadrants with respect to the main center point. For each quadrant, the distances from the main center point to contour center points are calculated (e.g., using the Pythagorean Theorem) and the contour center point that has the maximum distance from the main center point is selected as the fiducial point on that quadrant. Step 258 may be performed to locate the fiducial point on each corner of the image.

In step 259, each located fiducial point on the image is assigned a designation. In one embodiment, the fiducial points are assigned numerical designations from 1 to 4, in a clockwise direction starting from the upper left corner of the image.

FIGS. 4-11 pictorially illustrate a method of inspecting circuit boards for unauthorized modifications in accordance with an embodiment of the present invention.

Figure 4:
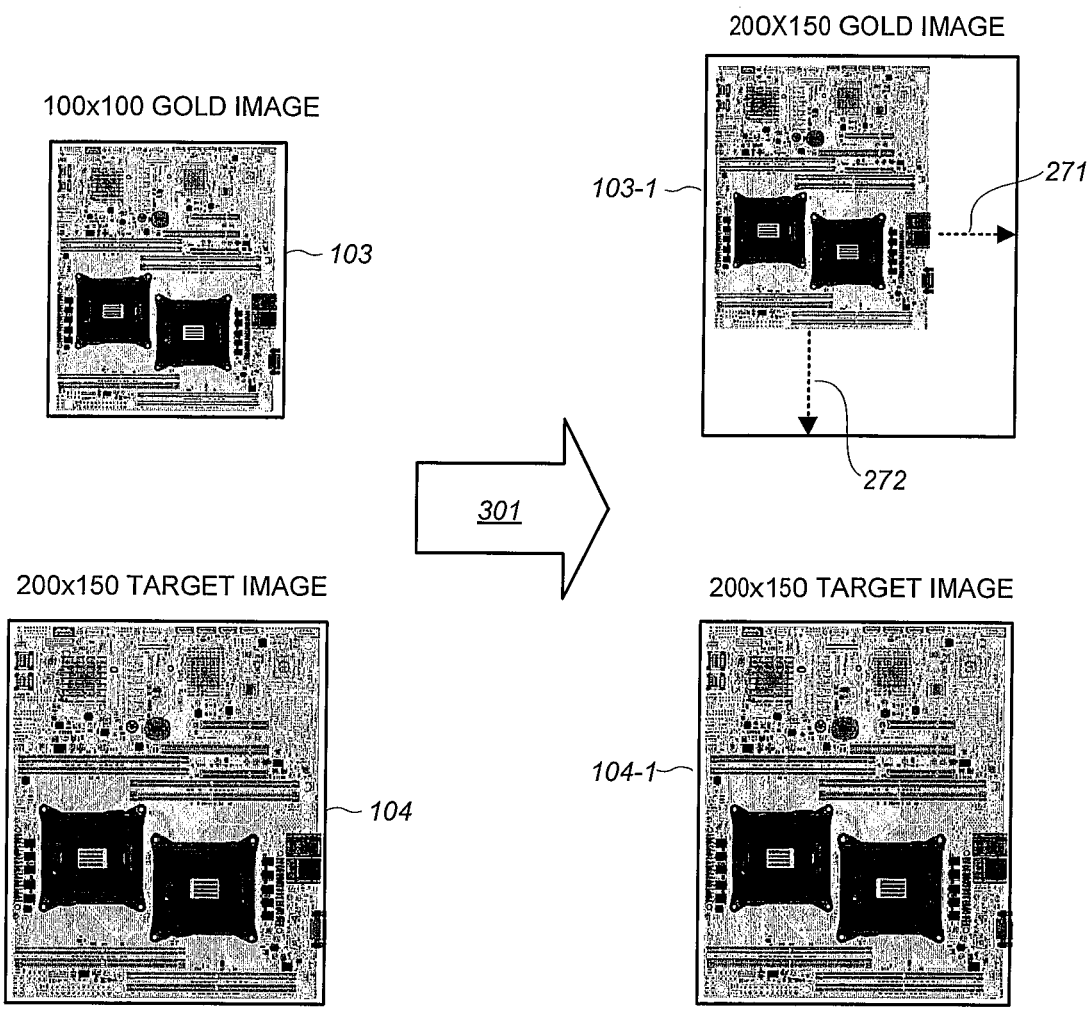
FIGS. 4-11 pictorially illustrate a method of inspecting circuit boards for unauthorized modifications in accordance with an embodiment of the present invention.

Referring to the example of FIG. 4, there are shown a gold image 103 and a target image 104 as received from the image acquisition system 110. The canvas sizes of the gold image 103 and the target image 104 are set to the same canvas size (see arrow 301). A canvas size may be in terms of width and height in units of pixels. In one embodiment, a width of the canvas size is set to the maximum canvas width between the gold image 103 and the target image 104 and a height of the canvas size is the maximum canvas height between the gold image 103 and the target image 104. In the example of FIG. 4, the gold image 103 has a canvas size of 100×100 pixels and the target image 104 has a canvas size of 200×150 pixels. Accordingly, the gold image 103 is scaled up by increasing its width (see arrow 271) and height (see arrow 272) to 200×150 pixels. It is to be noted that the aforementioned canvas sizes are given for ease of illustration. In general, one can use the highest resolution images available. The gold image 103 is relabeled as "103-1" and the target image 104 is relabeled as "104-1" to indicate that they have been scaled to the same canvas size.

Figure 5:
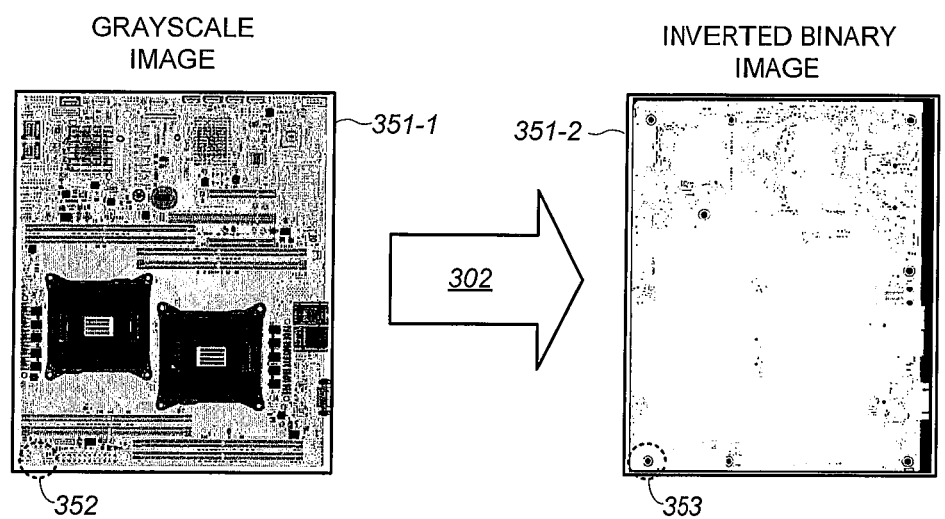
Figure 6:
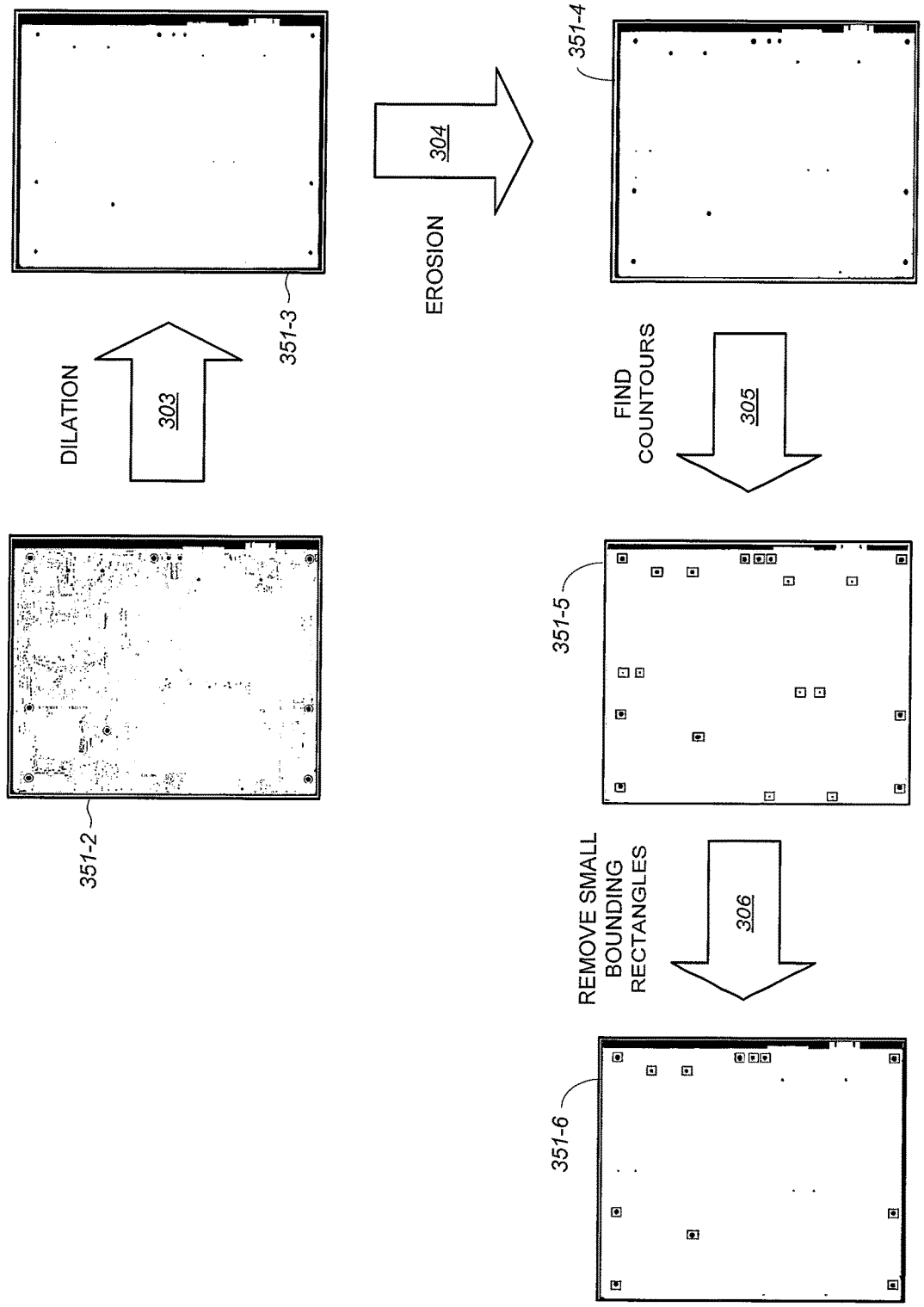
Figure 7:
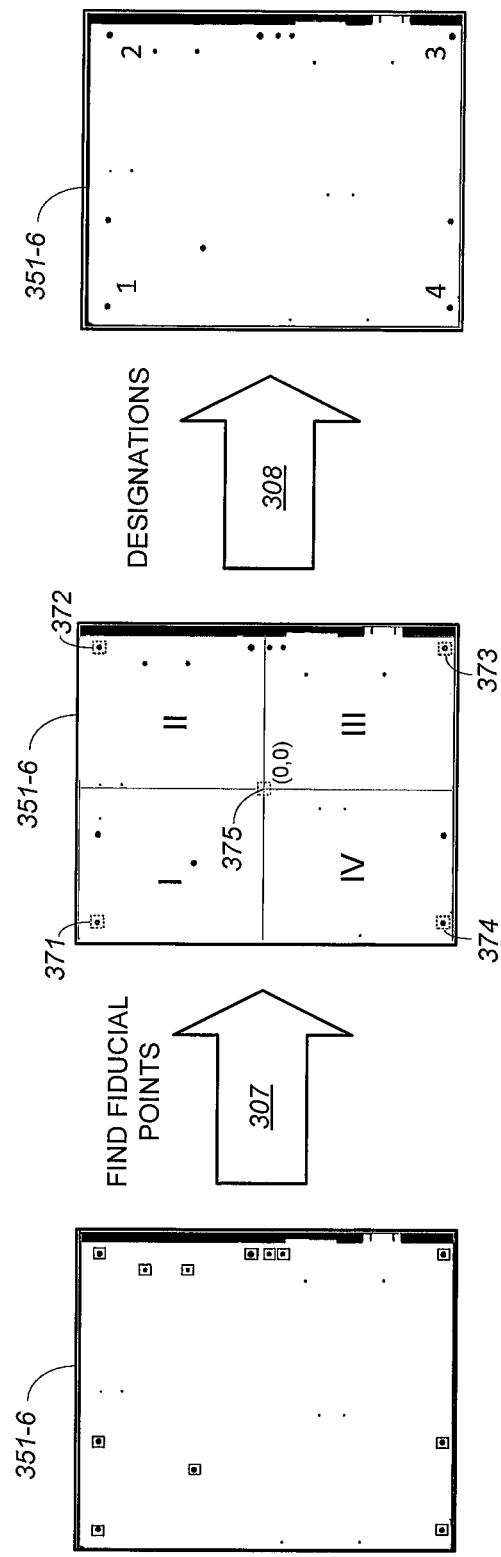
Figure 8:
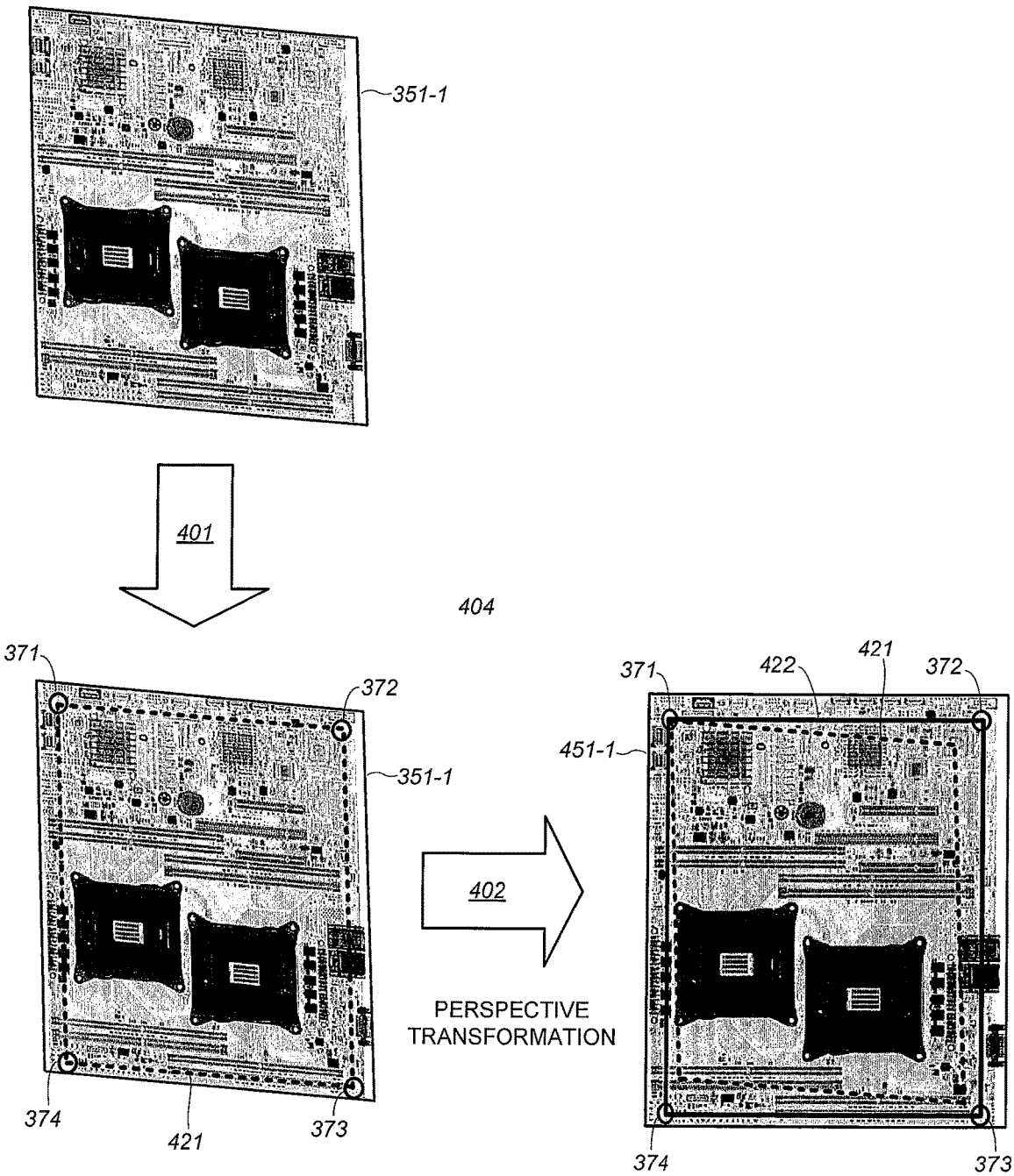

FIGS. 5-7 pictorially illustrate locating fiducial points on an image and FIG. 8 pictorially illustrates performing perspective transformation on the image using the located fiducial points for reference in accordance with an embodiment of the present invention. The image processing steps illustrated in FIGS. 5-8 may be performed on each of the gold image 103-1 and target image 104-1 of FIG. 4.

Referring to the example of FIG. 5, a grayscale image 351-1 is converted to an inverted binary image 351-2 (see arrow 302). The grayscale image 351-1 may be the gold image 103-1 or the target image 104-1 shown in FIG. 4. The grayscale image 351-1 may be converted to a binary image, and the binary image may be inverted to generate the inverted binary image 351-2. It is to be noted that a mounting hole (e.g., see dashed-circle 352), being a void, will appear as white in the binary image (not shown). Inverting the binary image makes the mounting hole appear as black (e.g., see dashed-circle 353) on the inverted binary image 351-2. The inverted binary image 351-2 thus facilitates location of mounting holes used as fiducial points.

In the example of FIG. 6, the inverted binary image 351-2 is dilated to expand the white portions on the inverted binary image 351-2 (see arrow 303). The dilation step removes small black spots from the inverted binary image 351-2 resulting in the dilated image 351-3. Thereafter, the white portions of the dilated image 351-3 are eroded to increase the visibility and contrast of the black portions (see arrow 304), resulting in the eroded image 351-4. The contours on the eroded image 351-4 are found (see arrow 305). The contours are bounded with rectangles, with the smaller bounding rectangles and their contours being removed from inspection consideration (see arrow 306). In one embodiment, the threshold for removing smaller bounding rectangles is based on the size of the fiducial points. As a particular example, when mounting holes are used as fiducial points, bounding rectangles with an area smaller than that of a mounting hole are removed from inspection consideration.

In the example of FIG. 6, the image 351-5 is the eroded image 351-4 shown with bounding rectangles (which are illustrated as small squares) and the image 351-6 is the eroded image 351-4 shown with the smaller bounding rectangles removed. It is to be noted that bounding rectangles do not have to be shown on an image but are shown on the image 351-5 and 351-6 for illustration purposes.

In the example of FIG. 7, fiducial points are located on each quadrant of the image 351-6 (see arrow 307). The main center point 375 of the image 351-6, which is also labeled as origin (0,0), is in the middle of the image for illustration purposes only. It is to be noted that, in one embodiment, the main center point 375 is the contour center point of the largest contour, which is not necessarily located in the middle of the image. The quadrants I, II, III, and IV of the image 351-6 are relative to the main center point 375. The fiducial points 371, 372, 373, and 374 are located as contour center points that are farthest away from the main center point 375 relative to other contour center points on the same quadrant. The located fiducial points 371, 372, 373, and 374 are assigned numerical designations (see arrow 308) in a clockwise direction starting from the upper left corner of the image 351-6.

In the example of FIG. 8, perspective transformation is performed on the image 351-1 (also shown in FIG. 5). As previously noted, the image 351-1 may be the gold image 103-1 or the target image 104-1 shown in FIG. 4. In the example of FIG. 8, the perspective error of the image 351-1 is exaggerated for illustration purposes. The previously located fiducial points 371, 372, 373, and 374 are identified on the image 351-1 (see arrow 401). A quadrilateral 421, whose corners are on the fiducial points 371, 372, 373, and 374, illustrates the perspective error on the image 351-1 before the perspective transformation. Using the fiducial points 371, 372, 373, and 374 for reference, perspective transformation is performed on the image (see arrow 402) to generate the perspective-transformed image 451-1. A quadrilateral 422, whose corners are on the fiducial points 371, 372, 373, and 374, illustrates the perspective transformation relative to the image 351-1 (compare quadrilateral 422 to quadrilateral 421). The image 451-1 may be blurred for noise reduction purposes.

Figure 9:
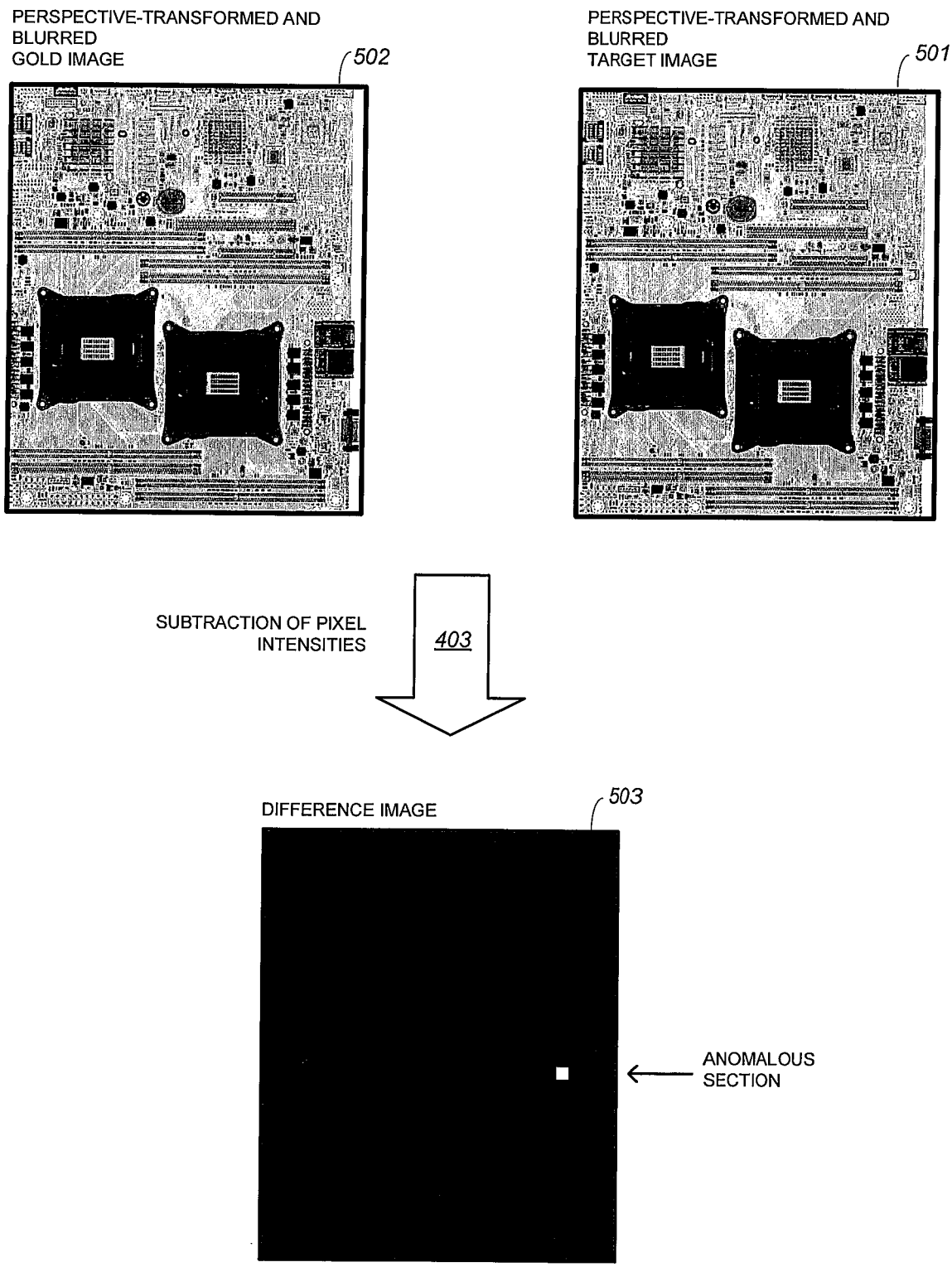
Figure 10:
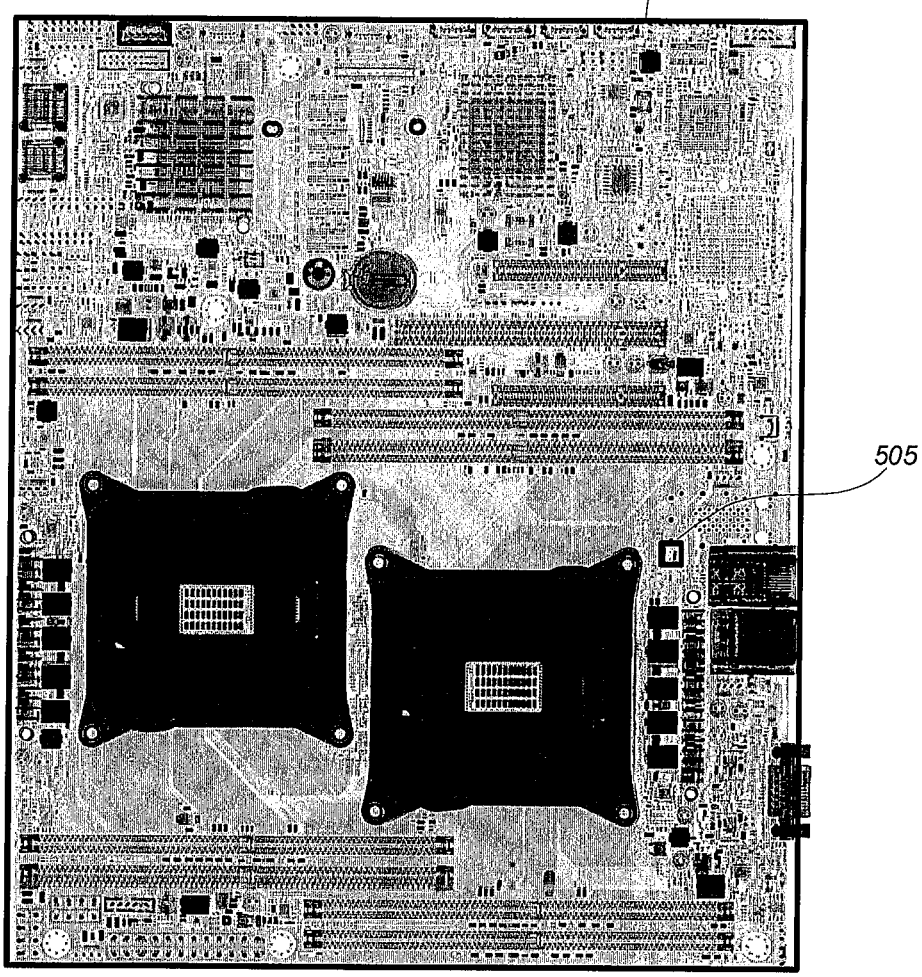

In the example of FIG. 9, a gold image 502 and a target image 501 represent the gold image 103-1 and the target image 104-1 of FIG. 4, respectively, after perspective transformation and blurring. The target image 501 is subtracted from the gold image 502 to generate a difference image 503 (see arrow 403). Each pixel of the difference image 503 has an intensity that is the difference between intensities of corresponding pixels of the gold image 502 and the target image 501. In the example of FIG. 9, a pixel with zero intensity appears as black. Accordingly, on the difference image 503, black sections of pixels indicate no modification, whereas lighter sections of pixels are indicative of a modification. A thresholding step may be performed to identify pixels that meet an intensity threshold, such that the intensities of those identified pixels may be increased (e.g., to maximum intensity) to enhance visibility. In the example of FIG. 9, a white section of pixels is an anomalous section that identifies a location of an unauthorized modification. As illustrated in FIG. 10, the anomalous section of pixels is marked with a marking 505, which is superimposed on the target image 501.

Figure 11:
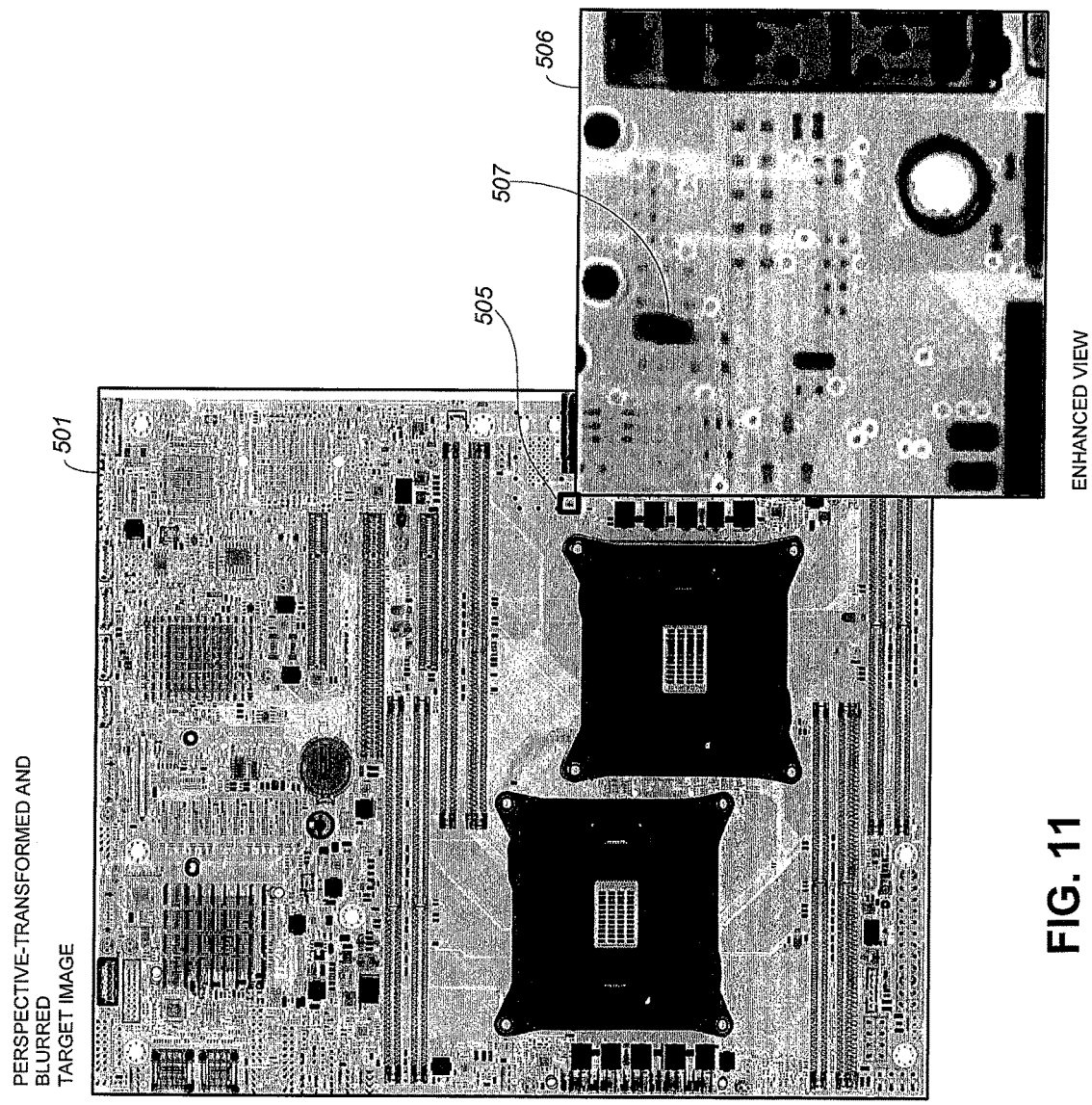

The portion of the target image 501 in the vicinity of the marking 505 may be enhanced to increase visibility of the unauthorized modification. In the example of FIG. 11, an enhanced view 506 is an enlargement of the area of the target image 501 in the vicinity of the marking 505. As is more evident in the enhanced view 506, a feature 507, which is not present on the gold image 502, is identified. The feature 507 may be a jumper wire, surface mount component, or other feature that is not authorized to be on the target circuit board 102.

System and method for inspecting circuit boards for unauthorized modifications have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of inspecting circuit boards for unauthorized modifications, the method comprising:
   acquiring an image of a target circuit board to generate a target image and of a gold circuit board to generate a gold image, the gold circuit board being a known-good circuit board;
   locating a plurality of fiducial points on the target image and on the gold image;
   performing perspective transformation on the target image using the fiducial points on the target image for reference and on the gold image using the fiducial points on the gold image for reference;
   after performing perspective transformation on the target image and on the gold image, identifying an anomalous section of pixels of the target image, the anomalous section of pixels of the target image having intensities that are different from intensities of a corresponding section of pixels of the gold image; and
   issuing an alert in response to identifying the anomalous section of pixels.

2. The method of claim 1, wherein identifying the anomalous section of pixels of the target image comprises:
   subtracting intensities of pixels of the target image from intensities of pixels of the gold image to generate a difference image; and
   identifying, on the difference image, pixels that have non-zero intensities.

3. The method of claim 2, further comprising:
   marking the pixels with the non-zero intensities with a marking; and
   superimposing the marking on the target image.

4. The method of claim 1, further comprising:
   enhancing a portion of the target image that includes the anomalous section of pixels.

5. The method of claim 1, wherein locating the plurality of fiducial points on the target image and on the gold image comprises:
   for each of the target image and the gold image:
     converting the image from grayscale to binary to generate a binary image;
     inverting the binary image to generate an inverted image;
     dilating the inverted image to generate a dilated image;
     eroding the dilated image to generate an eroded image;
     finding a main center point of the eroded image; and
     for each quadrant of the eroded image, locating a fiducial point as a point that is farthest away from the main center point relative to other points on the quadrant.

6. The method of claim 5, wherein finding the main center point of the eroded target image comprises:
finding a plurality of contours on the eroded target image, wherein the main center point is a center point of a contour that is largest among the plurality of contours.

7. The method of claim 6, further comprising:
bounding the plurality of contours with bounding rectangles; and
removing, from inspection consideration, contours with bounding rectangles that have an area that is smaller than a minimum area.

8. The method of claim 1, wherein each of the target image and the gold image is an X-ray image.

9. A system for detecting unauthorized modifications to circuit boards, the system comprising:
an image acquisition system that is configured to take an image of a target circuit board to generate a target image and of a gold circuit board to generate a gold image, the gold circuit board being a known-good circuit board; and
a computer comprising a processor and a memory, the memory storing instructions that when executed by the processor cause the computer to:
locate a plurality of fiducial points on the target image and on the gold image;
perform perspective transformation on the target image using the plurality of fiducial points on the target image for reference and on the gold image using the plurality of fiducial points on the gold image for reference; and
after the perspective transformation of the target image and the gold image, identify an anomalous section of pixels of the target image, the anomalous section of pixels of the target image having intensities that are different from intensities of a corresponding section of pixels of the gold image.

10. The system of claim 9, wherein the image acquisition system comprises an X-ray imaging machine.

11. The system of claim 9, wherein the instructions, when executed by the processor, cause the computer to identify the anomalous section of pixels by:
subtracting intensities of pixels of the target image from intensities of pixels of the gold image to generate a difference image; and
identifying, on the difference image, pixels that have non-zero intensities.

12. The system of claim 9, wherein the instructions, when executed by the processor, cause the computer to:
mark the anomalous section of pixels with a marking; and
superimpose the marking on the target image.

13. The system of claim 9, wherein the instructions, when executed by the processor, cause the computer to enhance an area of the target image that includes the anomalous section.

14. The system of claim 9, wherein the instructions, when executed by the processor, cause the computer to locate the plurality of fiducial points on the target image and on the gold image by:
for each of the target image and the gold image:
converting the image from grayscale to binary to generate a binary image;
inverting the binary image to generate an inverted image;
dilating the inverted image to generate a dilated image;
eroding the dilated image to generate an eroded image;
finding a main center point of the eroded image; and
for each quadrant of the eroded image, locating a fiducial point as a point that is farthest away from the main center point relative to other points on the quadrant.

15. A method of inspecting circuit boards for unauthorized modifications, the method comprising:
locating fiducial points on a target image of target circuit board and on a gold image of a gold circuit board, the gold circuit board being a known-good circuit board;
performing perspective transformation on the target image using the fiducial points on the target image for reference and on the gold image using the fiducial points on the gold image for reference;
after performing perspective transformation on the target image and on the gold image, subtracting intensities of pixels of the target image from intensities of corresponding pixels of the gold image; and
detecting an unauthorized modification to the target circuit board by identifying pixels of the target image and corresponding pixels of the gold image that have different intensities.

16. The method of claim 15, wherein each of the target image and the gold image is an X-ray image.

17. The method of claim 15, further comprising:
after performing perspective transformation on the target image and on the gold image but before subtracting the intensities of pixels of the target image from intensities of corresponding pixels of the gold image, performing noise reduction on the target image and on the gold image.

18. The method of claim 15, wherein locating the fiducial points on the target image and on the gold image comprises:
for each of the target image and the gold image:
finding contour center points of contours on the image;
finding a main center point of the image; and
for each quadrant of the image, selecting a fiducial point as a contour center point that is farthest away from the main center point relative to other contour center points on the quadrant.

19. The method of claim 18, wherein the main center point of the image is a contour center point of a largest contour on the image.

20. The method of claim 19, wherein the fiducial points comprise mounting holes.

* * * * *